United States Patent [19]

McCauley

[11] Patent Number: 5,990,030
[45] Date of Patent: Nov. 23, 1999

[54] $SO_x$ REDUCING ADDITIVE FOR FCC SYSTEMS

[75] Inventor: John R. McCauley, Louisville, Md.

[73] Assignee: Tricat Industries, Inc., Baltimore, Md.

[21] Appl. No.: 08/874,888

[22] Filed: Jun. 13, 1997

[51] Int. Cl.[6] ..................................... B01J 29/06
[52] U.S. Cl. ............................ 502/64; 502/344; 502/415
[58] Field of Search ............................... 502/64, 344, 415

[56] References Cited

U.S. PATENT DOCUMENTS

| | | | |
|---|---|---|---|
| 2,992,884 | 7/1961 | Bienstock et al. ....................... | 502/415 |
| 3,405,196 | 10/1968 | Wolff ........................................ | 502/344 |
| 3,835,031 | 9/1974 | Bertolacini et al. . | |
| 4,233,276 | 11/1980 | D'Souza et al. . | |
| 4,369,130 | 1/1983 | Bertolacini et al. . | |
| 4,381,991 | 5/1983 | Bertolacini et al. . | |
| 4,459,371 | 7/1984 | Hobbs et al. ............................ | 502/341 |
| 4,626,419 | 12/1986 | Lewis et al. . | |
| 4,668,655 | 5/1987 | Lewis et al. ............................. | 502/304 |
| 4,735,705 | 4/1988 | Burk, Jr. et al. . | |
| 4,755,499 | 7/1988 | Neal et al. ............................... | 502/415 |
| 5,021,228 | 6/1991 | Dai et al. . | |
| 5,108,979 | 4/1992 | Magnabosco et al. . | |
| 5,215,953 | 6/1993 | Blumrich et al. ....................... | 502/218 |
| 5,288,675 | 2/1994 | Kim . | |
| 5,399,327 | 3/1995 | Kim .................................... | 423/244.11 |
| 5,427,995 | 6/1995 | Ziebarth et al. ........................ | 502/411 |
| 5,547,648 | 8/1996 | Buchanan et al. . | |
| 5,589,602 | 12/1996 | Smith et al. ............................. | 585/671 |

FOREIGN PATENT DOCUMENTS 0 247 836  12/1987  European Pat. Off. .

OTHER PUBLICATIONS

Alak B. Bhattacharyya et al., "Catalytic $SO_x$ Abatment: The Rule of Magnesium Aluminate Spinel in the Removal of $SO_x$ from Fluid Catalytic Cracking (FCC) Flue Gas", Ind. Eng. Chem. Res., 1988, vol. 27, pp. 1356–1360.

Ashok K. Vijh, "A Thermochemical Approach to the Gas–Phase Reduction of Metal Sulphates", Journal of Materials Science, 1978, vol. 13, pp. 2413–2417.

Faith Habashi et al., "Reduction of Sulfates by Hydrogen", Can. J. Chem., 1976, vol. 54, pp. 3646–3650.

Jacob Mu et al., "Thermal Decomposition of Inorganic Sulfates and Their Hydrates", American Chemical Society, Ind. Eng. Chem. Process Des. Dev., 1981, vol. 20, No. 4, pp. 640–646.

*Primary Examiner*—Thomas Dunn
*Attorney, Agent, or Firm*—McDermott, Will & Emery

[57] ABSTRACT

Sulfur oxides are removed in the regenerator zone and rapidly released as $H_2S$ in the reactor zone of an FCC system employing a particulate $SO_x$ reducing additive comprising an alkali metal oxide. Embodiments comprise the incorporation of an inorganic support, MgO, $CeO_2$ or Ag, and $V_2O_5$.

6 Claims, 9 Drawing Sheets

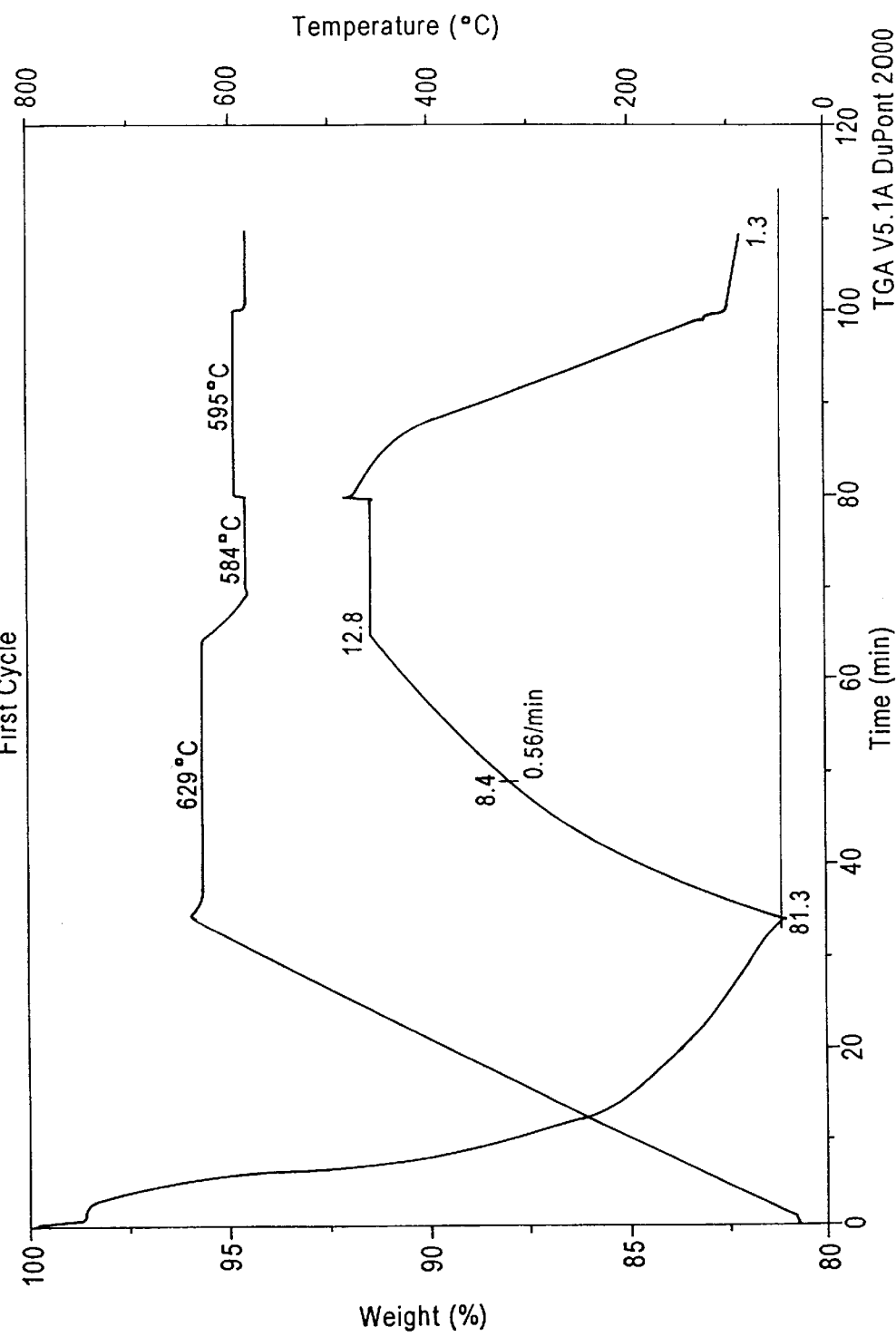

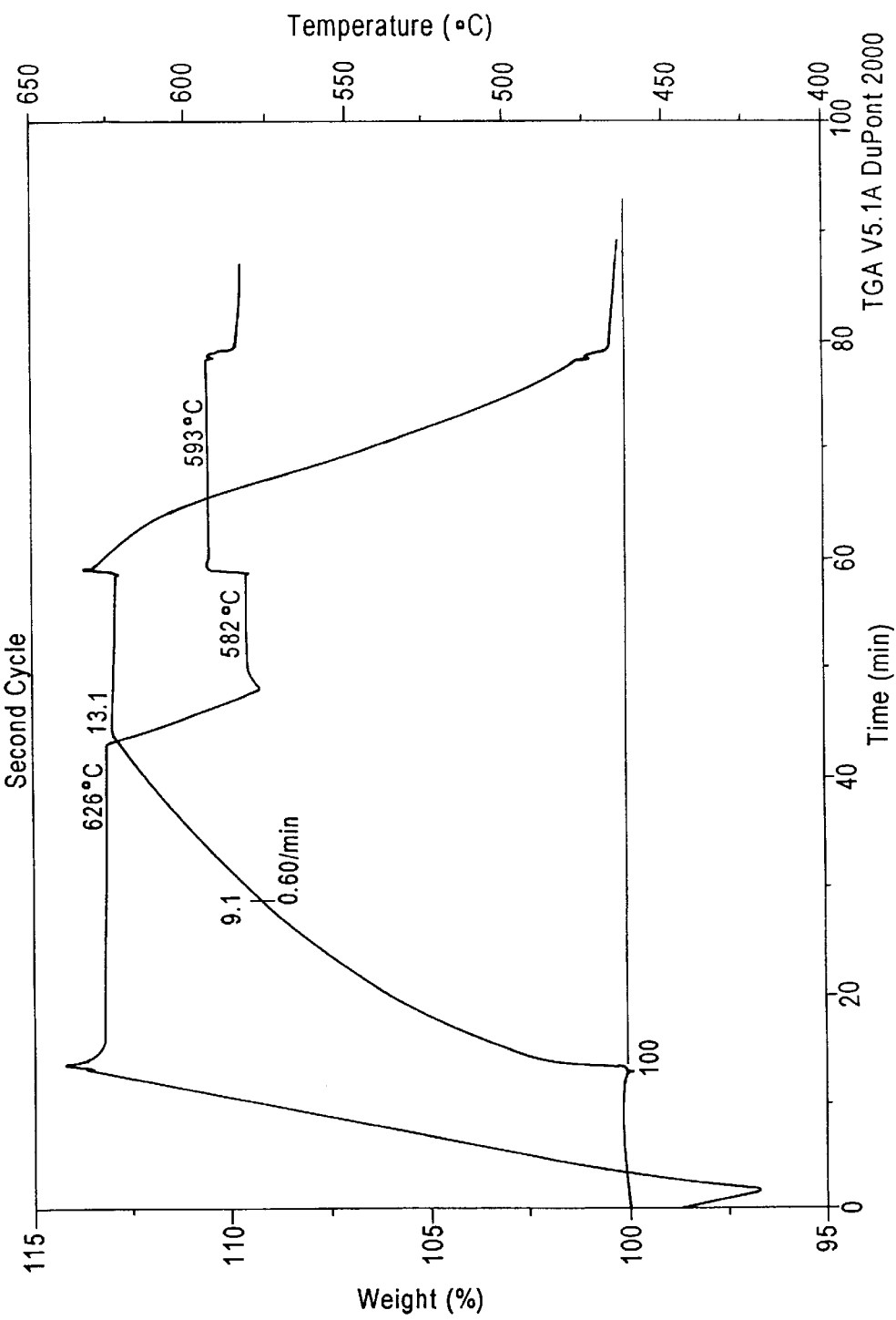

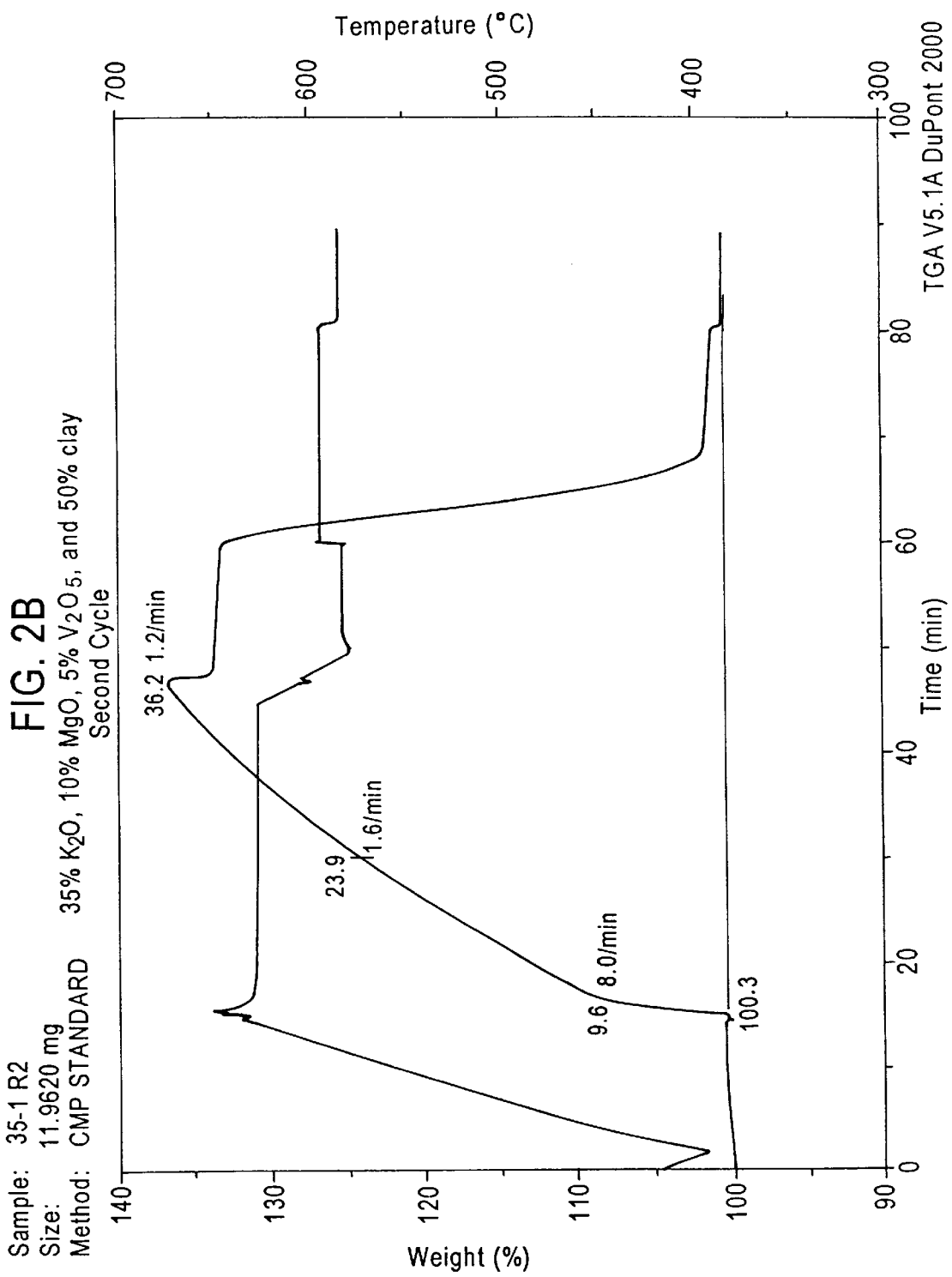

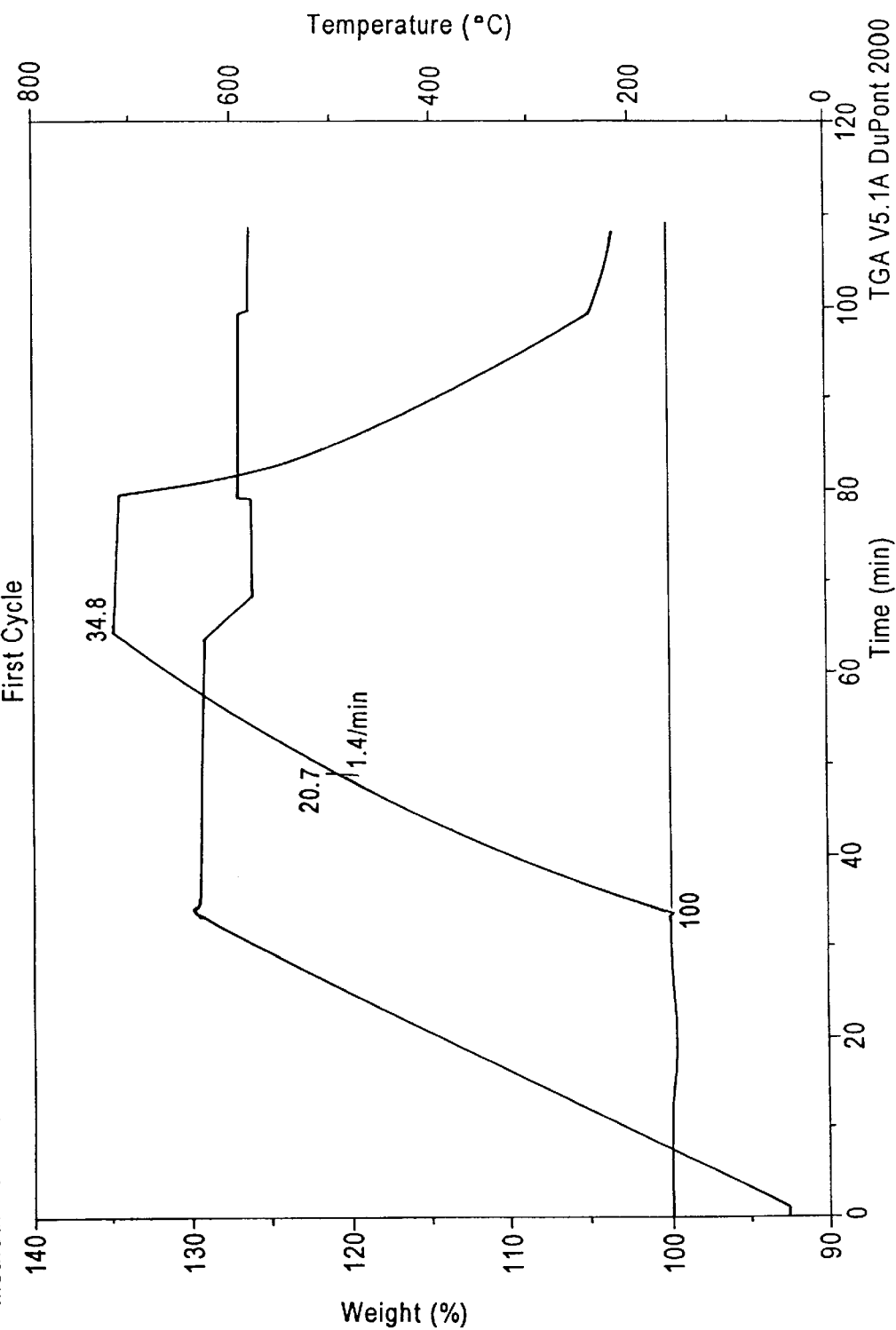

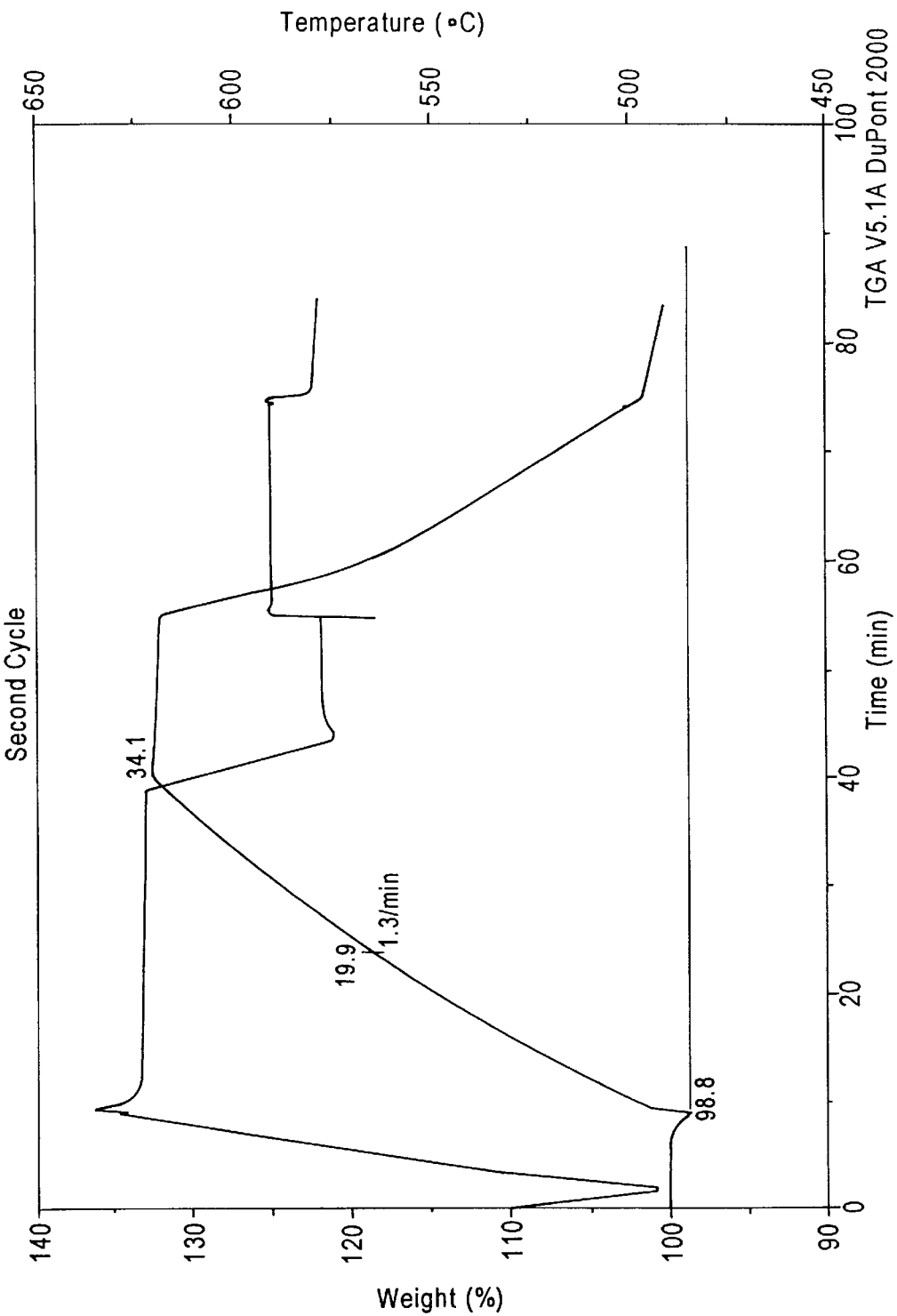

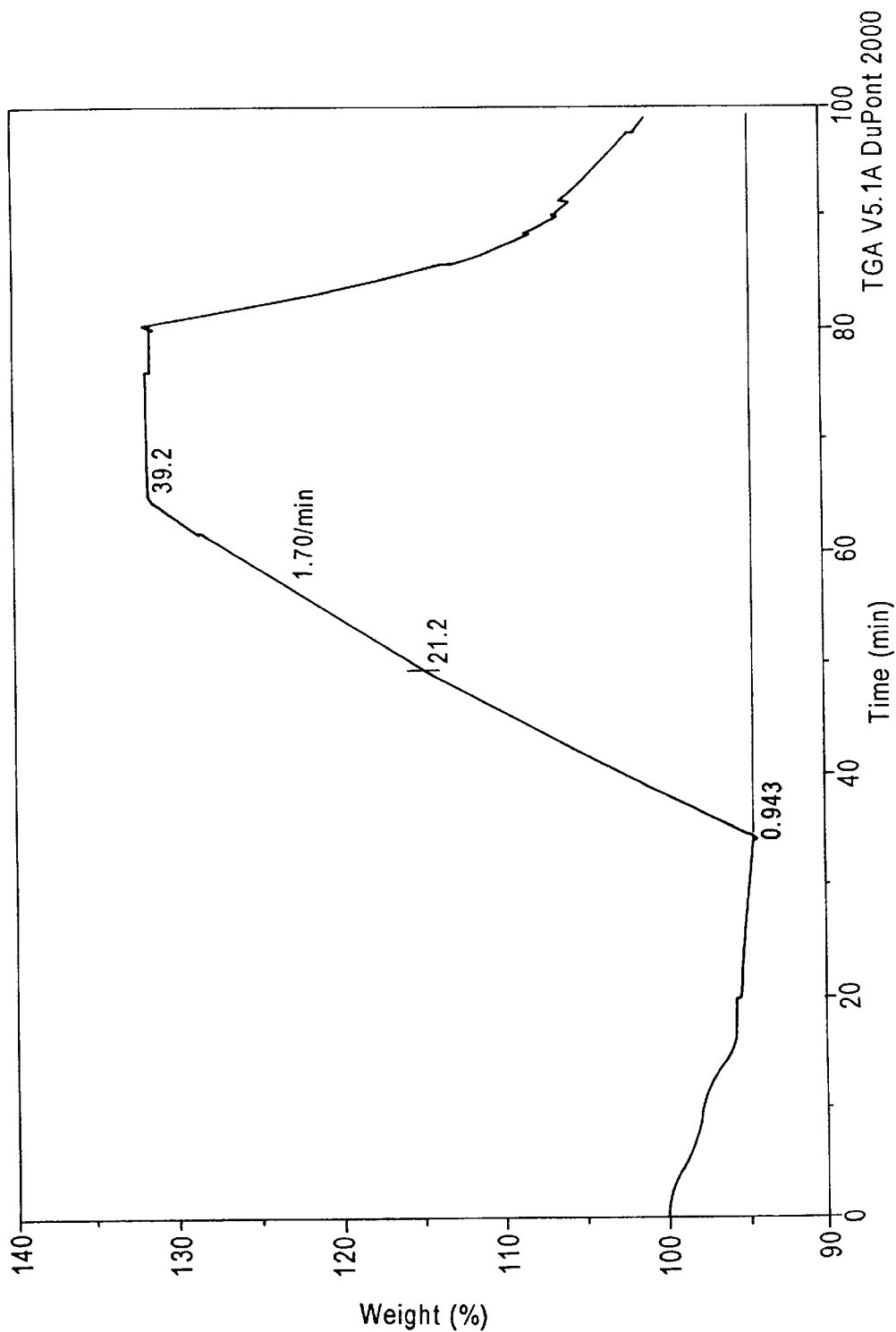

$SO_x$ REDUCING ADDITIVE FOR FCC SYSTEMS

TECHNICAL FIELD

The present invention relates to a catalytic absorbent for sulfur oxides. The invention has particular applicability in reducing the emission of sulfur oxides during fluidized catalytic cracking of sulfur-containing hydrocarbon feedstocks.

BACKGROUND ART

A major industrial challenge comprises the development of efficient methods for reducing the concentration of air pollutants, such as sulfur oxides, in waste gases, such as waste gases resulting from the processing and combustion of sulfur-containing hydrocarbon fuels. The discharge of these waste gas streams into the atmosphere is environmentally undesirable at the sulfur oxide concentrations which are frequently encountered in conventional operations. Such waste gas streams typically result, for example, from the combustion of sulfur-containing fossil fuels for the generation of heat and power, the regeneration of catalysts employed in the refining of hydrocarbon feedstocks which contain organic sulfur compounds, and the operation of Claus-type sulfur recovery units.

Two fundamental approaches have been suggested for the removal of sulfur oxides ($SO_x$) from a waste gas. One approach involves scrubbing the waste gas with an inexpensive alkaline material, such as lime or limestone, which reacts chemically with $SO_x$ yielding a non-volatile product for disposal. Unfortunately, this approach requires a large and continual supply of the alkaline scrubbing material, and the resulting reaction products can create a solid waste disposal problem of substantial magnitude. The second principal approach to the control of $SO_x$ emission involves the use of $SO_x$ absorbents which can be regenerated either thermally or chemically.

Numerous materials have been proposed for use in removing $SO_x$ from gases. For example, Bertolacini et al., U.S. Pat. No. 3,835,031, disclose the use of a crystalline aluminosilicate cracking catalyst impregnated with a Group IIA metal compound or mixture thereof as an oxide or oxides, inclusive of magnesium oxide or magnesia (MgO), for reduced $SO_x$ emission in the regenerator stack gases.

De'Souza et al., U.S. Pat. No. 4,233,276, disclose a method for removing oxidizable sulfur compounds from a waste gas utilizing a metal oxide absorbent, inclusive of sodium, potassium, lithium, magnesium, calcium, strontium, barium, scandium, titanium, chromium, iron, molybdenum, manganese, cobalt, nickel, antimony, copper, zinc, cadmium, lead and rare earth metals, and further inclusive of oxidation promoters such as rutheniuam, osmium, rhodium, silver, iridium, palladium, platinum, vanadium and molybdenum.

Bertolacini et al., U.S. Pat. No. 4,369,130, disclose a fluidized catalytic cracking (FCC) catalyst in combination with an absorbent rare earth metal compound and an inorganic oxide, such as an oxide of aluminum, magnesium, zinc, titanium and calcium. The disclosed absorbent can be circulated through an FCC system together with the hydrocarbon cracking catalyst to reduce Sox emissions from the regenerator zone.

Bertolacini et al., U.S. Pat. No. 4,381,991, disclose a process for removing $SO_x$ from a gas using an absorbent comprising MgO in combination with at least one rare earth metal. The disclosed absorbent can be circulated through an FCC system together with the hydrocarbon cracking catalyst to reduce $SO_x$ emissions from the regenerator zone.

Lewis et al., U.S. Pat. No. 4,626,419, disclose a process for removing $SO_x$ from a mixture of gases utilizing a composite containing a porous refractory support bearing a first component comprising bismuth, chromium or a rare earth metal, such as cerium, and a second component comprising an alkali metal, such as potassium. Burk, Jr. et al., U.S. Pat. No. 4,735,705, disclose an FCC process employing an FCC catalyst in combination with $SO_x$ absorbent particles comprising at least one spinel containing an additive inclusive of an alkali metal, calcium, barium, strontium, beryllium and mixtures thereof. Dai et al., U.S. Pat. No. 5,021,228, disclose the removal of $SO_x$ from gases by contact with a composition comprising alumina containing potassium and thorium. Magnabosco et al., U.S. Pat. No. 5,108,979, disclose the use of spinels to reduce levels of $SO_x$ in the context of an FCC system.

Kim, U.S. Pat. No. 5,288,675, discloses an $SO_x$ gettering composition for use in an FCC system. The disclosed gettering composition comprises an attrition-resistant, coprecipitated magnesia-lanthana-alumina component combined with a catalytic oxidation and/or reducing promoter metal such as ceria, vanadia and/or titania.

Buchanan et al., U.S. Pat. No. 5,547,648, disclose a method of removing $SO_x$ from a combustion flue gas stream emitted from an FCC reactor utilizing an absorbent comprising any of numerous components, such as Group IA metals, Group IIA metals, and Group VIII metals. Magnesium aluminate spinels impregnated with vanadium and cerium are disclosed as particularly useful.

Moore et al., European Patent Application No. EP 0 247 836 A1 disclose an FCC catalyst inventory comprising an FCC catalyst and an $SO_x$ absorbent comprising one or more rare earth metal oxides, particularly lanthanium or cerium, supported on attrition-resistant particles of alumina or a magnesia-alumina spinel. Moore et al. recognize that the limited commercial success of various $SO_x$ additives is due to the exigencies of an FCC system.

The cyclic, FCC of heavy petroleum fractions is one of the major refining operations involved in the conversion of crude petroleum oils to valuable products, such as the fuels utilized in internal combustion engines. A typical FCC unit comprises three sections: a cracking section or reactor; a regenerator and a separation section or stripping zone. A typical FCC process involves continuous catalytically cracking of a petroleum feedstock in a reactor zone through contact with a particulate FCC catalyst at temperatures between about 400° C. and about 700° C. Particulate FCC catalysts substantially deactivated by non-volatile, sulfur-containing coke deposits are separated from the reactor zone effluent and stripped of volatile deposits in a stripping zone. The stripped catalyst particles are separated from the stripping zone effluent, regenerated in a regenerator zone by combustion of the coke with an oxygen-containing gas at temperatures between about 565° C. and about 790° C., and the regenerated catalyst particles returned to the reactor zone. The combustion of sulfur-containing coke results in the release of substantial amounts of $SO_x$ to the atmosphere.

While numerous materials and composites are known to have absorbent and catalytic properties in connection with $SO_x$ reduction, the formulation of an efficient $SO_x$ reducing additive, e.g., catalyst and/or absorbent, in the context of an FCC system and it exigencies is fraught with problems and unpredictability.

Generally, about 45% to about 55% of the sulfur in the hydrocarbon feedstock is converted to hydrogen sulfide ($H_2S$) in the FCC reactor, about 35% to about 45% remains in a liquid product, and about 5% to about 10% in the coke deposited on the FCC catalyst. These amounts vary depending upon the type of hydrocarbon feedstock, rate of hydrocarbon cycle, steam stripping rate, type of FCC catalyst, reactor temperature, reactor design and other FCC system variables. Accordingly, the formulation of an effective additive for reducing $SO_x$ emissions from an FCC system is recognized in the art as a challenging problem. See the previously mentioned Moore et al., EP 0 247 836 A1; and Bhattacharyya et al., "Catalytic $SO_x$ Abatement: The Role of Magnesium Aluminate Spinel in the Removal of $SO_x$ from Fluid Catalytic Cracking (FCC) Flue Gas," Ind. Eng. Chem. Res. 1988, 27, pp. 1356–1360.

The difficulties attendant upon formulating and designing an effective $SO_x$ reducing additive in the context of an FCC system stems from various requirements and considerations, aside from the generally unpredictable nature of catalytic activity. The particulate material serving as the $SO_x$ reducing additive must be attrition-resistant to survive in an FCC environment without fragmenting. Accordingly, an effective $SO_x$ reducing additive should have a Davison Index less than 10. An effective particulate SOX reducing additive should not contain any metal or other component which actually functions as a poison in the FCC regime. In addition, an effective particulate SOX catalyst/absorbent must perform three functions: (1) oxidize $SO_2$ to $SO_3$; (2) chemisorb $SO_3$; and (3) release the absorbed $SO_3$ as $H_2S$ in the reactor side of an FCC system. During regeneration, sulfur in the coke is oxidized primarily to $SO_2$. In order for sulfate chemisorbtion to occur, the $SO_2$ must be oxidized to $SO_3$ which is then chemisorbed as the sulfate. As the operational temperature of the regenerator is increased, the formation of $SO_3$ is less favored. Accordingly, the catalyzing function of an $SO_x$ catalyst/absorbent is significant.

In FCC units operating with high sulfur-containing feedstocks, relatively large amounts of sulfur acceptors having a high unit capacity to adsorb $SO_x$ are required to accomplish reductions in $SO_x$ levels. The use of large amounts of an $SO_x$ reducing additive results in appreciable dilution of the active FCC catalyst in the cracking reaction cycle whether the sulfur acceptor is a part of the FCC particle itself or is present as a discrete entity circulated with the FCC catalyst inventory. A basic limitation is that conditions of time and temperature for operating cyclic FCC units, especially heat balanced FCC units, are geared to maximizing the production of desired products. Conditions established to achieve this result are by no means those that are optimum for reversibly reacting $SO_x$ in the regenerator zone and carrying the sulfur back to the reactor for conversion at least in part to $H_2S$. Although $SO_x$ reducing additives offer promise, they leave much to be desired because, inter alia, $SO_x$ removal activity decreases rapidly with the residence time available for such $SO_x$ reducing additives to function effectively.

Desorption of absorbed $SO_x$ typically involves hydrolysis of a metal sulfide to form the original metal oxide yielding $H_2S$. Therefore, an effective $SO_x$ catalyst/absorbent must be capable of liberating the absorbed sulfur in the form $H_2S$ under conditions prevailing in the reactor portion of an FCC system. Bhattacharyya et al., in the previously mentioned publication, reported the results of experimental testing to determine the feasibility of actually employing various $SO_x$ catalytic/absorbents in an FCC unit. Among the candidates studied were MgO impregnated with ceria ($CeO_2$) for oxidizing $SO_2$ to $SO_3$, and a magnesium aluminate spinel ($Mg_2Al_2O_5$). Vanadium pentoxide ($V_2O_5$) was recognized as an excellent oxidation catalyst for converting $SO_2$ to $SO_3$. However, $V_2O_5$ was shunned because of its expected undesirable reaction with zeolites, the predominant type of FCC catalyst. Accordingly, $CeO_2$ was employed for the oxidation of $SO_2$ to $SO_3$. Another tested catalyst was $CeO_2$ on gamma alumina.

The testing reported by Bhattacharyya et al. reveals that $CeO_2$ in gamma alumina was not a very effective $SO_x$ catalyst/absorbent. $CeO_2$ impregnated MgO was found to be significantly more effective in absorbing $SO_3$ than $CeO_2$ on gamma alumina. However, magnesium sulfate ($MgSO_4$) is extremely stable and, hence, could not be regenerated as efficiently as the $CeO_2$-gamma alumina catalyst/absorbent. Testing revealed that about 27% of absorbed material remained with the $CeO_2$—MgO $SO_x$ catalyst/absorbent, even after 20 minutes of hydrogen reduction, possibly as magnesium sulfide (MgS) or unreduced $MgSO_4$. Bhattacharyya et al. concluded that the rapid deactivation of the $CeO_2$—MgO $SO_x$ catalyst-absorbent is a major reason why it was not considered as a potential $SO_x$ catalyst/absorbent for FCC systems. In addition, MgO lacks the requisite attrition-resistant properties for FCC application, in that it is very soft and breaks down into very fine particles in a short period of time. The unsuitability of MgO as an $SO_x$ catalyst/absorbent in an FCC environment is apparently well known in the art and also reported by Magnabosco et al. in U.S. Pat. No. 5,108,979, wherein the presence of free magnesium oxide is disclosed as undesirable. The experimental testing conducted by Bhattacharyya et al. led to the conclusion that thermally stable magnesium aluminate spinels, such as $MgAl_2O_4$ or $Mg_2Al_2O_5$, were best suited for FCC application. Indeed, a spinel base catalyst, such as that commercialized as DESOX™, is currently recognized as the $SO_x$ catalyst/absorbent of choice for FCC systems.

Copending application Ser. No. 08/874,516, filed on Jun. 13, 1997, discloses an $SO_x$ catalyst/absorbent comprising MgO, $CeO_2$ and/or Ag, and $V_2O_5$. The disclosed $SO_x$ catalyst/absorbent rapidly and effectively releases absorbed $SO_x$ and enjoys utility in an FCC system, as part of the catalyst inventory.

There is a continuing need for an $SO_x$ reducing additive, suitable for use in an FCC system, which is capable of absorbing $SO_x$ in the regenerator zone, given regenerator zone exigencies, including residence time and temperature, and capable of rapidly releasing the absorbed $SO_x$ in the reactor zone of an FCC system, given reactor zone exigencies, including residence time and temperature. There further exists a need to produce such an $SO_x$ reducing additive in a cost-effective and efficient manner.

DISCLOSURE OF THE INVENTION

An object of the present invention is an FCC catalyst inventory comprising an efficient $SO_x$ reducing additive which can be produced in a cost-effective and efficient manner.

Another object of the present invention is an efficient $SO_x$ reducing additive which can be produced economically.

A further object of the present invention is a process for catalytically cracking a sulfur-containing hydrocarbon feedstock using a particulate FCC catalyst inventory comprising an efficient $SO_x$ reducing additive.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a fluidized catalytic cracking composition comprising: a particulate cracking catalyst for cracking a hydrocarbon feedstock; and a particulate sulfur oxide reducing additive comprising an alkali metal oxide selected from the group consisting of $Na_2O$, $Li_2O$, $K_2O$, and mixtures thereof, wherein the sulfur oxide reducing additive has a bulk density of about 0.5 to about 0.9 g/cc, a particle size of about 20 to about 180 microns, and a Davison Index less than 10.

A further aspect of the present invention is a particulate sulfur oxide reducing composition comprising: (a) MgO; (b) $V_2O_5$; and (c) an alkali metal oxide selected from the group consisting of $Na_2O$, $Li_2O$, $K_2O$ and mixtures thereof.

Another aspect of the present invention is a process for the cyclic fluidized catalytic cracking of a hydrocarbon feedstock containing organic sulfur compounds, which process comprises: cracking the hydrocarbon feedstock under fluidizing conditions using a particulate cracking catalyst in a reactor zone, whereby the cracking catalyst is deactivated by sulfur-containing coke deposits; passing the deactivated cracking catalyst to a regenerator zone; removing the sulfur-containing coke deposits from the deactivated cracking catalyst in the regenerator zone by burning with an oxygen containing regeneration gas, thereby forming sulfur oxides; absorbing the sulfur oxides in the regenerator zone with a fluidizable particulate sulfur oxide reducing additive comprising an alkali metal oxide selected from the group consisting of $Na_2O$, $Li_2O$, $K_2O$, and mixtures thereof, wherein the sulfur oxide reducing additive has a bulk density of about 0.5 to about 0.9 g/cc, a particle size of about 20 to about 180 microns and a Davison Index less than 10; and removing the absorbed sulfur oxides from the sulfur oxide reducing additive as a sulfur-containing gas comprising hydrogen sulfide in the reactor zone.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIGS. 1A and 1B are thermogravimetric analysis (TGA) plots showing weight change as a function of time during first and second cycles, respectively, of an $SO_x$ reducing additive in accordance with an embodiment of the present invention.

FIGS. 2A and 2B are TGA plots showing weight change as a function of time during first and second cycles, respectively, of another embodiment of the present invention.

FIGS. 4A and 4B are TGA plots showing weight change as a function of time during first and second cycles, respectively, of another embodiment of the present invention.

FIG. 5 is a TGA plot showing weight change as a function of time for an $SO_x$ catalyst/absorbent comprising MgO and $CeO_2$.

BEST MODE FOR CARRYING OUT THE INVENTION

Figure 2A:
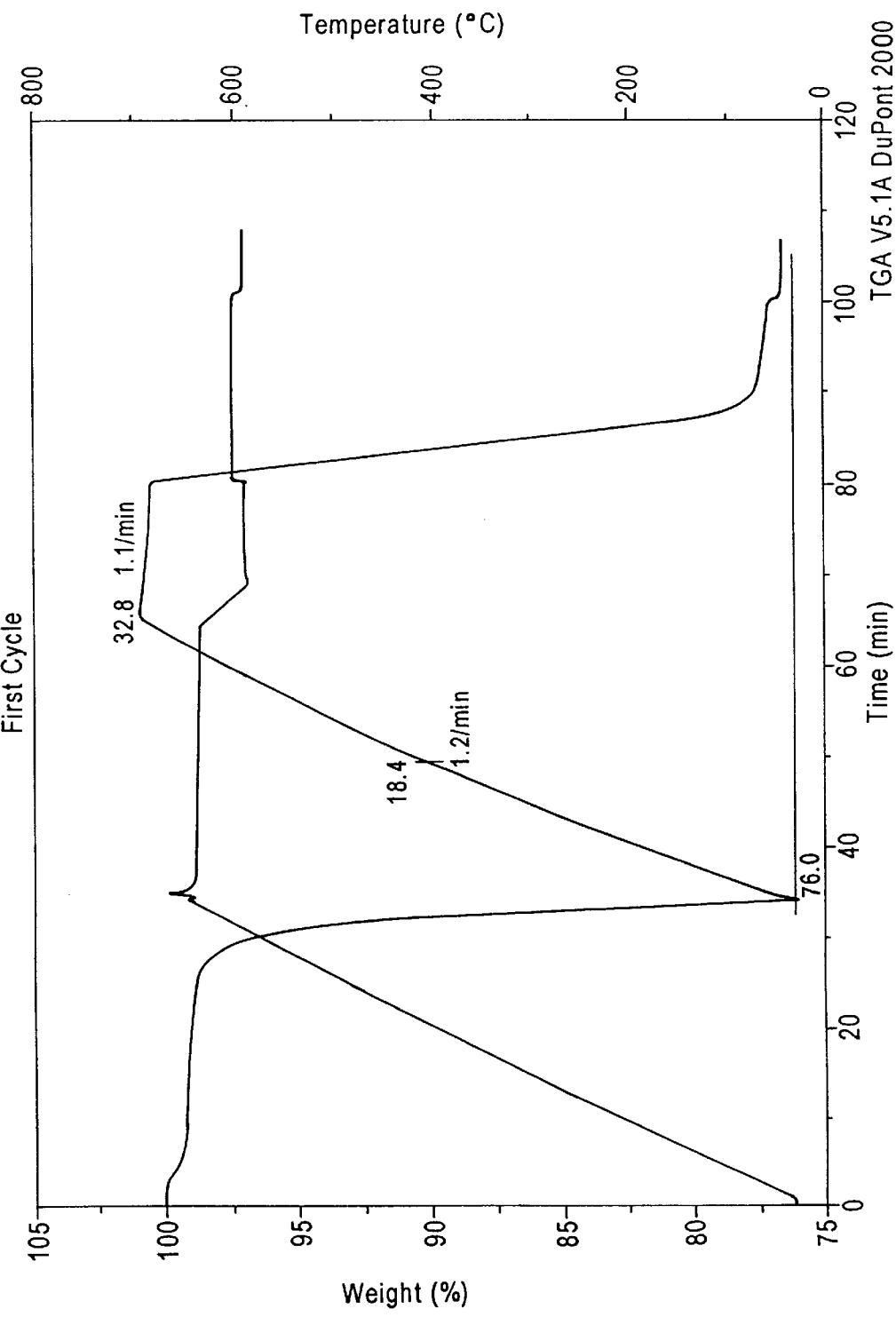

The present invention stems from the discovery that an alkali metal oxide, such as sodium oxide ($Na_2O$), potassium oxide ($K_2O$) or lithium oxide (LiO), can function effectively and efficiently as an $SO_x$ reducing additive in an FCC system, absorbing $SO_x$ in the regenerator zone and releasing absorbed $SO_x$ in the reactor zone, even without an oxidation promoter or reduction promoter. The formation of a sulfate of an alkali metal is a known reaction. However, the reduction of an alkali metal sulfate was considered to require a temperature considerably in excess of that in the reactor zone of an FCC system. See, for example, Vijh, "A thermochemical approach to the gas-phase reduction of metal sulphates," Journal of Materials Science, 13, 1978, pp. 2413–2417; Habashi et al., "Reduction of sulfates by hydrogen," Department of Mining in Metallurgy, Can. J. Chem., Vol. 54, 1978, pp. 3646–3650; and Mu et al., "Thermal Decomposition of Inorganic Sulfates and Their Hydrates," 1981 American Chemical Society, Ind. Eng. Chem. Process Des. Dev., Vol. 20, No. 4, 1981, pp. 640–646. For example, Habashi et al. reveal a decomposition temperature for sodium sulfate ($Na_2SO_4$) of 900° C.

The $SO_x$ reducing additive of the present invention comprising an alkali metal oxide can be provided on an inorganic support, such as an alumina, e.g., gamma alumina, or a clay, such as bentonite, the alkali metal oxide comprising an effective amount for $SO_x$ reduction, e.g., up to about 50%. All percentages expressed herein are in weight percent.

The inventive alkali metal oxide $SO_x$ reducing additive can advantageously be combined with other $SO_x$ reducing additives, including an $SO_x$ catalyst/absorbent, such as those containing spinels, free MgO, MgO and $V_2O_5$, or the MgO—$CeO_2$/Ag—$V_2O_5$ $SO_x$ catalyst/absorbent disclosed in copending application Ser. No. 08/874,514. Advantageously, the alkali metal oxide $SO_x$ reducing additive of the present invention can be employed by itself as an absorbent, preferably on a support, without an oxidation catalyst for oxidizing $SO_2$ to $SO_3$, and/or without a reducing catalyst to effect decomposition of the alkali metal sulfate to $H_2S$ in the reactor zone of an FCC system.

The mechanism underpinning the high absorptivity of and rapid, effective release of absorbed $SO_x$ by the alkali metal oxide $SO_x$ reducing additive of the present invention, particularly without the presence of an oxidation and/or reduction promoter, is not fully understood. It is believed, however, that at least in the embodiments comprising an inorganic support, such as an alumina, some interaction may occur between the alumina and the alkali metal oxide which weakens subsequently formed alkali metal sulfate bonds, thereby enabling reduction at considerably lower temperatures than reported.

It was also surprisingly found that upon combining the inventive alkali metal oxide $SO_x$ reducing additive with an MgO support or with another MgO-containing $SO_x$ reducing additive, such as the MgO—$CeO_2$/Ag—$V_2O_5$ $SO_x$ catalyst/absorbent disclosed in copending application Ser. No. 08/874,516, there is an initial rapid pick up of $SO_x$ in the regenerator zone, thereby improving overall efficiency, since the residence time and other conditions in the regenerator zone are designed to optimize the yield of a desired product.

The $SO_x$ reducing additive of the present invention is advantageously formed as a particulate material consistent with the requirements of an FCC system. Accordingly, the particulate $SO_x$ reducing additive of the present invention has a bulk density of about 0.5 to about 0.9 g/cc, preferably about 0.7 to about 0.8 g/cc, a particle size of about 20 to about 180 microns, preferably about 45 to about 120 microns, and a Davison Index less than 10.

The $SO_x$ reducing additive in accordance with the present invention can be prepared by various processes, such as sequentially mixing, drying, calcining and sieving. For example, in an embodiment of the present invention, about 21.2 grams of sodium nitrate ($NaNO_3$) containing about 36.5% $Na_2O$, about 19 grams of cerium nitrate $[Ce(NO_3)_3]$ containing about 52.8% $CeO_2$, and about 2.6 grams of ammonium vanadate ($NH_4VO_3$) containing about 77% $V_2O_5$, are dissolved in about 700 grams of water. About 58.8 grams of bentonite clay (about 85% oxide) are dispersed in the resulting solution. It is believed that clay functions to ultimately bind the other ingredients into a hard dense particle. About 32.6 grams of MgO (92% MgO) are then added to the slurry which is stirred until homogeneous. The slurry is then dried in an oven at about 120° C. until weight loss is negligible. The resulting solids are then calcined in a furnace to about 700° C. for about one hour. The resulting material is then ground and sieved to retain an average particle size of about 78 microns. In a preferred method in accordance with the present invention, the above formed slurry is spray dried to obtain spherically shaped particles with an average particle size of about 78 microns. Spray drying is preferable, in that it involves fewer processing steps.

Another method of preparing an $SO_x$ reducing additive of the present invention comprises impregnating an inorganic support with some or all of the active ingredients. For example, the MgO, $V_2O_5$ and clay are spray dried and $Na_2NO_3$ is subsequently impregnated onto the support. Impregnation is conducted by contacting the support with a solution containing $NaNO_3$. The amount of solution employed is just enough to fill the pores of the support. After calcination, metal oxides remain.

The $SO_x$ reducing additive in accordance with the present invention can be advantageously employed in an FCC catalyst inventory comprising a conventional particulate FCC cracking catalyst capable of cracking a sulfur-containing hydrocarbon feedstock. Conventional FCC cracking catalysts comprise various aluminosilicate zeolites.

The $SO_x$ reducing additive of the present invention unexpectedly rapidly absorbs $SO_x$ in the regenerator zone and unexpectedly rapidly releases the absorbed $SO_x$ as $H_2S$ at temperatures prevailing in the reactor zone of an FCC system, including temperatures below 700° C., even below 600° C, contrary to expectations because of the known high durability of the alkali metal sulfate bond. Magnabosco et al., U.S. Pat. No. 5,108,979, in preparing spinels for use in an FCC system, shuns the presence of $Na_2O$ because of its very durable sulfate bond. Indeed, Magnabosco et al. expressly shun the presence of both $Na_2O$ and MgO in an $SO_x$ reducing additive because of their adverse impact on the desorption activity of an $SO_x$ reducing additive. The present invention, therefore, proceeds against conventional wisdom by employing an alkali metal oxide absorbent, alone or with MgO, in an FCC catalyst inventory.

The alkali metal-containing $SO_x$ reducing additive in accordance with the present invention can comprise a support, such as bentonite clay or an alumina, such as gamma alumina, with up to about 50% of an alkali metal oxide thereon, preferably 15% to 35%. The $SO_x$ reducing additive of the present invention can comprise, in addition to an alkali metal oxide, other $SO_x$ reducing additives, such as the $MgO$—$CeO_2/Ag$—$V_2O_5$ $SO_x$ catalyst/absorbent disclosed in copending application Ser. No. 08/874,516. For example, an $SO_x$ reducing additive in accordance with the present invention can comprise: about 10% to about 90% MgO, preferably about 10% to about 50% MgO; about 2% to about 15% $CeO_2$, preferably about 5% to about 10% $CeO_2$, or about 1% to about 5% Ag, preferably about 1% to about 3% Ag; about 1% to about 10% $V_2O_5$, preferably about 1% to about 5% $V_2O$; up to 50% of an alkali metal oxide, e.g., $Na_2O$, preferably about 15% to about 35% $Na_2O$; and a support such as bentonite clay or an alumina, such as gamma alumina.

EXAMPLES

Four $SO_x$ reducing additives of the present invention were prepared having the following components:

Sample 1: 20% $Na_2O$ and 80% $Al_2O_3$;

Sample 2: 35% $K_2O$, 10% MgO, 5% $V_2O$ and 50% bentonite clay;

Sample 3: 17.9% $K_2O$, 68.3% MgO, 11.5% $CeO_2$ and 2.3% $V_2O$; and

Sample 4: 20% $Li_2O$, 10% $V_2O_5$ and 70% bentonite clay.

For comparison purposes, Sample 5 was prepared comprising 95% MgO, and 5% $CeO_2$.

Each Sample was subjected to TGA and plots prepared showing weight change as a function of time. The standard evaluation procedure employed in testing all Samples comprised initially heating the Sample for about twenty minutes to a temperature of about 700° C. under nitrogen ($N_2$) gas, during which pretreatment moisture and decomposition products were removed. After a constant weight was achieved, a gas stream of $SO_x$, $O_2$ and $N_2$ was passed over each Sample for about thirty minutes, whereby a weight gain was observed as the Sample absorbed $SO_x$. After absorption, the gas stream was changed back to $N_2$ and the temperature was reduced to about 650° C. for about fifteen minutes to determine if the weight gain was stable. After stability was achieved, the gas stream was changed to hydrogen gas for about twenty minutes. A weight loss was observed as sulfur was released as $H_2S$.

As shown in FIG. 1A, Sample 1, comprising 20 wt. % $NaO_2$ and 80% $Al_2O_3$, exhibited a surprisingly rapid release of absorbed $SO_x$ as $H_2S$ at a temperature below 600° C. Advantageously, as shown in FIG. 1B, there was no deactivation of Sample 1 and $H_2S$ release was complete in that Sample 1 returned to its base line weight.

FIG. 2A, involving inventive Sample 2, demonstrates an unexpectedly high $SO_x$ pick up of about 32.8 wt. %. Comparing FIG. 2A with FIG. 5 involving MgO—$CeO_2$, the contribution to the $SO_x$ weight pick up by MgO in inventive Sample 2 would be expected to be about 3.9 wt. %. However, the $SO_x$ pick up of 32.8% by Sample 2 was unexpectedly high, suggesting synergism.

FIG. 2B demonstrates that Sample 2 did not undergo deactivation during the second cycle. In addition, it is observed from FIG. 2B that the initial $SO_x$ pick is characterized by a dramatically high pick up rate of about 8% per minute, which is believed to be attributed to $K_2O$. After the initial high $SO_x$ pick up rate, the slope gradually changed to about 1.6% per minute, which is believed to be attributed to the catalytic activity of MgO—$V_2O_5$. The high initial pick up is unexpectedly advantageously consistent with the short residence time requirement in the regenerator zone. FIG. 2B also shows the absence of expected deactivation due to the presence of MgO.

Figure 3A:
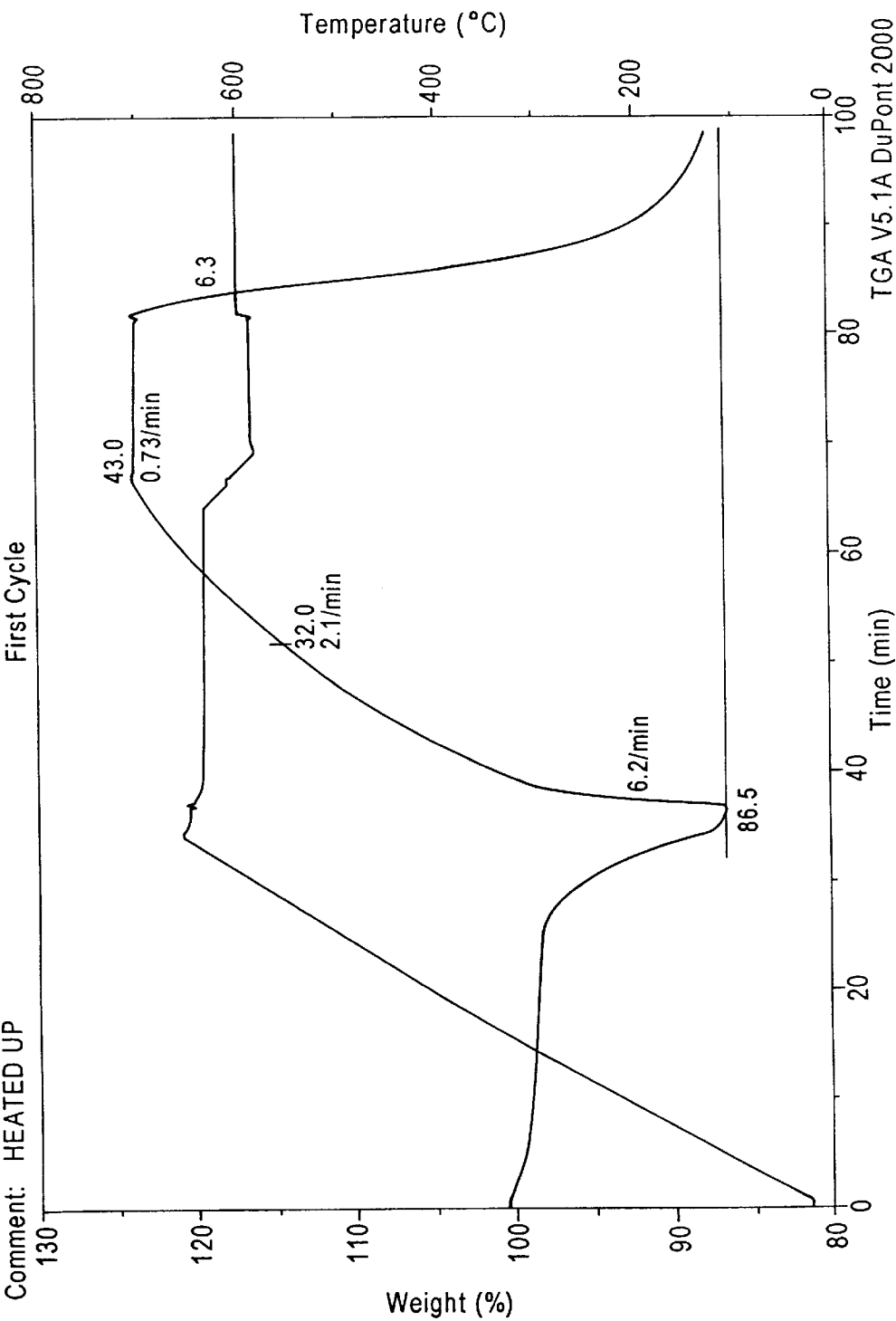
FIGS. 3A and 3B are TGA plots showing weight change as a function of time during first and second cycles, respectively, of another embodiment of the present invention.
Figure 3B:
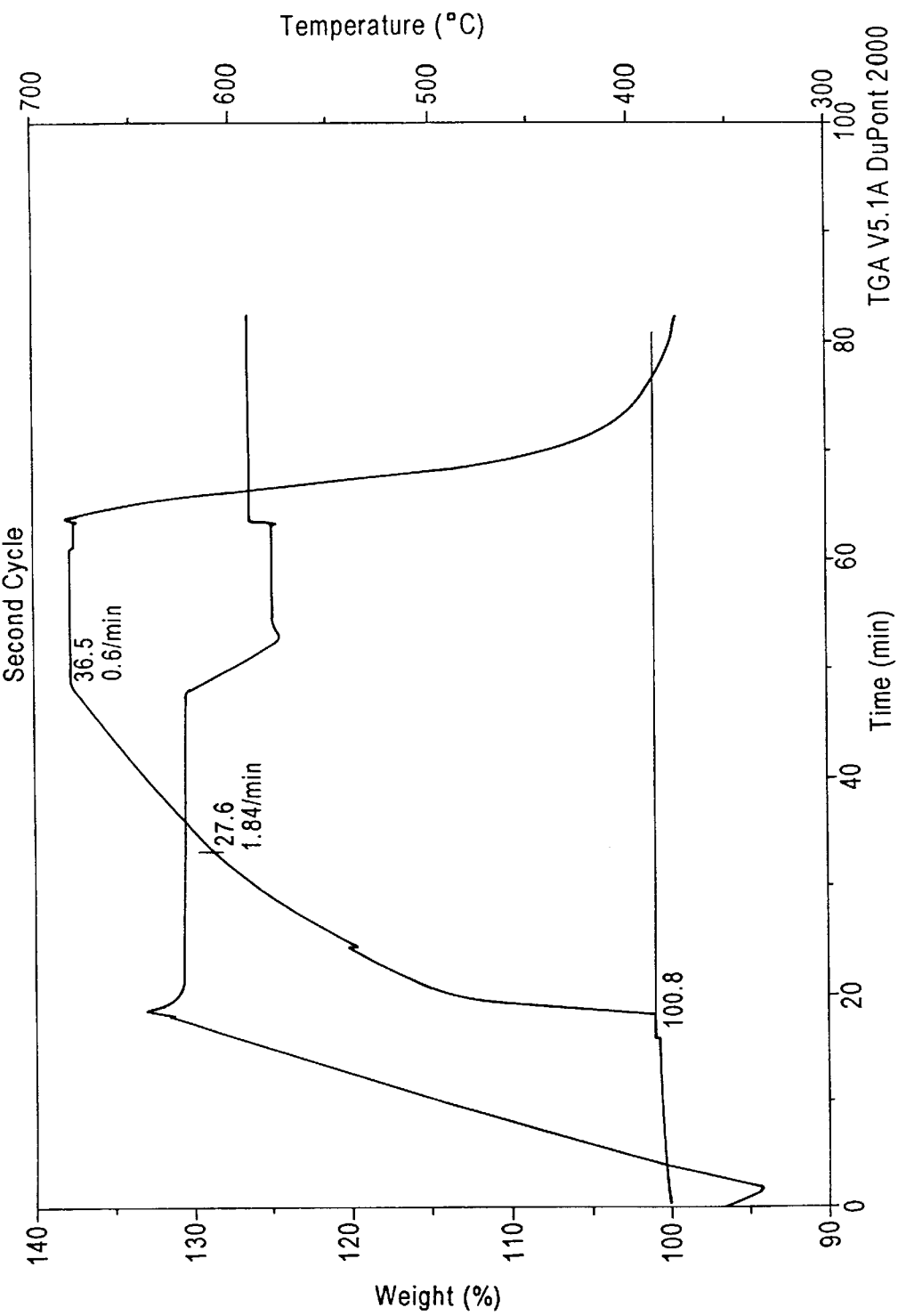

Inventive Sample 3, containing 68.3% MgO and 17.9% $K_2O$, with no support, as shown in FIG. 3A, also experienced an initial unexpectedly rapid $SO_x$ pick up of about 6.2 k per minute, which is believed attributable to $K_2O$. The subsequent slower rate of about 2.1 wt. % per minute is attributable to the $MgO/CeO_2/V_2O_5$ components. It is also apparent from FIG. 3A that inventive Sample 3 exhibits a high $SO_x$ pick up. FIG. 3B is also characterized by initial rapid $SO_x$ pick up similar to that of FIG. 3A, and further shows the absence of deactivation during the second cycle, notwithstanding the large amount of MgO.

FIG. 4A demonstrates that inventive Sample 4, which did not contain any MgO, also exhibited an unexpectedly high $SO_x$ pick up of about 34.8 wt. %. FIG. 4B demonstrates similar results and the lack of deactivation during a second cycle.

The above examples demonstrate that the $SO_x$ reducing additive of the present invention exhibits unexpectedly rapid and high $SO_x$ absorption and release activity in an FCC environment. The inventive alkali metal oxide $SO_x$ reducing additive can advantageously be employed in any of various FCC systems in the catalyst inventory with any of various conventional FCC cracking catalysts, such aluminosilicate zeolites.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A fluidized catalytic cracking composition comprising:

a particulate cracking catalyst for cracking a hydrocarbon feedstock; and a component selected from the group consisting of: (a) a particulate sulfur oxide additive consisting essentially of 20% $Na_2O$ and 80% $Al_2O_3$; (b) a particulate sulfur reducing additive consisting essentially of 35% $K_2O$, 10% MgO, 5% $V_2O_5$ and bentonite clay; (c) a particulate sulfur oxide with reducing additive consisting essentially of 17.9% $K_2O$, 68.3% MgO, 11.5% $CeO_2$ and 2.3% $V_2O_5$; and (d) a particulate sulfur oxide reducing additive consisting essentially of 20% $Li_2O$, 10% $V_2O_5$ and 70% bentonite clay.

2. The composition according to claim 1, wherein the sulfur oxide reducing additive has a bulk density of about 0.7 to about 0.8 g/cc and a particle size of about 45 to about 120 microns.

3. The composition according to claim 1, wherein the component is (a) a particulate sulfur oxide reducing additive consisting essentially of 20% $Na_2O$ and 80% $Al_2O_3$.

4. The composition according to claim 1, wherein the component (b) a particulate sulfur reducing oxide consisting essentially of 35% $K_2O$, 10% MgO, 5% $V_2O_5$ and bentonite clay.

5. The composition according to claim 1, wherein the component is (c) a particulate sulfur oxide with reducing additive consisting essentially of 17.9% $K_2O$, 68.3% MgO, 11.5% $CeO_2$ and 2.3% $V_2O_5$.

6. The composition according to claim 1, wherein the component is (d) a particulate sulfur oxide reducing additive consisting essentially of 20% $Li_2O$, 10% $V_2O_5$ and 70% bentonite clay.

* * * * *